United States Patent
Kulczycki (10) Patent No.: US 12,351,005 B2
(45) Date of Patent: Jul. 8, 2025

(54) PLUG FOR REDUCING POTENTIAL DAMAGE TO AN OUTER BELT CAP AND METHOD

(71) Applicant: COOPER-STANDARD AUTOMOTIVE INC., Northville, MI (US)

(72) Inventor: Richard Kulczycki, Canton, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 273 days.

(21) Appl. No.: 17/830,689

(22) Filed: Jun. 2, 2022

(65) Prior Publication Data

US 2022/0388383 A1    Dec. 8, 2022

Related U.S. Application Data

(60) Provisional application No. 63/196,840, filed on Jun. 4, 2021.

(51) Int. Cl.
    *B60J 10/18*            (2016.01)
    *B60J 10/36*            (2016.01)
    *B60J 10/75*            (2016.01)

(52) U.S. Cl.
    CPC ............... *B60J 10/18* (2016.02); *B60J 10/36* (2016.02); *B60J 10/75* (2016.02)

(58) Field of Classification Search
    CPC .................................. B60J 10/18; B60J 10/75
    See application file for complete search history.

(56) References Cited

U.S. PATENT DOCUMENTS

| | | | | |
|---|---|---|---|---|
| 3,742,649 | A | * | 7/1973 | Dochnahl ............ B60J 10/265 49/495.1 |
| 5,819,472 | A | * | 10/1998 | Frost ...................... B60J 10/18 428/36.9 |
| 6,968,649 | B2 | | 11/2005 | Van Den Oord |
| 10,532,692 | B2 | | 1/2020 | Hundt et al. |
| 2006/0053614 | A1 | * | 3/2006 | Tamura ................ B60J 10/265 29/451 |
| 2006/0168892 | A1 | | 8/2006 | Dohles et al. |
| 2008/0012242 | A1 | * | 1/2008 | Brocke ................... B60J 10/75 277/637 |
| 2010/0313487 | A1 | * | 12/2010 | Ellis ...................... B60J 10/265 49/502 |

(Continued)

FOREIGN PATENT DOCUMENTS

| | | |
|---|---|---|
| CN | 1450961 A | 10/2003 |
| CN | 201439300 U | 4/2010 |

(Continued)

OTHER PUBLICATIONS

German Examination Report, dated May 23, 2024, in connection with German Appln. No. 102022111951.3.

(Continued)

*Primary Examiner* — Gregory J Strimbu
(74) *Attorney, Agent, or Firm* — Lippes Mathias LLP (57) ABSTRACT

A plug is disclosed that reduces a potential for damage to a cap or bright strip of a weatherstrip assembly. The plug can be an elongated member having a cross-sectional dimension that extends between and contacts an indented, transition region of a body of the weatherstrip assembly and an inner surface of the cap.

8 Claims, 6 Drawing Sheets

(56) References Cited

U.S. PATENT DOCUMENTS

| | | | | |
|---|---|---|---|---|
| 2012/0297726 A1* | 11/2012 | Ellis | ............ | B60J 10/75 |
| | | | | 52/716.7 |
| 2013/0174492 A1* | 7/2013 | Laycoe | ............ | B60J 10/75 |
| | | | | 29/527.1 |
| 2017/0036590 A1* | 2/2017 | Stegemann | ............ | B60J 10/265 |
| 2022/0388383 A1* | 12/2022 | Kulczycki | ............ | B60J 10/265 |

FOREIGN PATENT DOCUMENTS

| | | | |
|---|---|---|---|
| CN | 203681231 U | | 7/2014 |
| CN | 205439925 U | | 8/2016 |
| DE | 10256131 A1 | | 6/2004 |
| DE | 102015100327 A1 | | 7/2016 |
| DE | 10 2015 015 748 | * | 6/2017 |
| EP | 3421278 | * | 1/2019 |
| GB | 2 395 973 | * | 6/2004 |

OTHER PUBLICATIONS

Office Action issued Sep. 4, 2024 in connection with CN Appin. No. 202210629572.0.

* cited by examiner

PLUG FOR REDUCING POTENTIAL DAMAGE TO AN OUTER BELT CAP AND METHOD

This application claims the priority benefit of U.S. provisional application Ser. No. 63/196,480, filed Jun. 4, 2021, the entire disclosure of which is expressly incorporated herein by reference.

BACKGROUND

This invention relates to an apparatus for reducing the potential for damage to a cap or bright strip of a weatherstrip assembly, and more particularly to an insert or plug configured for receipt within a cavity of a vehicle outer belt assembly, and associated methods that reduce and/or limit the potential for damage (e.g., denting) to a cap or bright strip of the vehicle outer belt assembly.

Typically, weatherstrip assemblies or weatherstrips are provided on a vehicle to seal around the perimeters of doors and window openings in a vehicle. It is common with many of today's vehicles to enhance the appearance of the weatherstrips, particularly those weatherstrips located about the window openings. For example, along the lower edge of a window opening there is provided a weatherstrip referred to as an outer belt. The outer belt is secured to the vehicle such as through use of an inverted U-shaped mounting portion of a body of the weatherstrip inwardly that includes gripping flanges for engaging the vehicle panel. The mounting portion is oftentimes reinforced with a reinforcing member or carrier such as a metal core that provides additional strength and rigidity to the outer belt. Extending outwardly from a first or inner surface of the body, such as along a first or inner leg of the U-shaped mounting portion, is/are one or more sealing lips configured to slidingly, sealingly engage a surface of the window. A second or outer leg of the U-shaped mounting portion faces outwardly from the vehicle and thus forms a show surface of the weatherstrip. A first shoulder is provided on the second leg adjacent a bight portion of the U-shaped mounting portion and a second shoulder is provided in spaced relation to the first shoulder at or adjacent a terminal end portion of the second leg. The second leg is often configured with a transition region that defines central indented or bent portion so that an angled portion of the second leg generally follows the profile of the vehicle in that region. Extending over the second leg is a cap or bright strip that generally extends along the elongated longitudinal extent of the outer belt, i.e., along the lower edge of the window opening. Upper and lower edges of the cap operatively engage the first and second shoulders to secure the cap in overlying, covering relation with the second leg of the weatherstrip. Thus, the cap and the second leg form an elongated hollow cavity that generally extends the length of the outer belt assembly.

During assembly to the vehicle, or after the vehicle has been assembled, it has been found that the cap can be dented, i.e., deformed inwardly, which is undesirable and unfortunately noticeable. It is common that the cap or bright strip, i.e., a metal such as aluminum or stainless, could be inadvertently marred during assembly or after the weatherstrip has been mounted on the vehicle. The vehicle manufacturer and/or the weatherstrip supplier thus seek a solution to reduce the potential for damage to the weatherstrip, and particularly limit the potential for damage to the cap/bright strip during assembly and/or after the weatherstrip has been mounted on the vehicle.

A need exists for an improved system that resolves at least one or more of the above-described problems, as well as still other features and benefits.

SUMMARY

A support or plug is an elongated member having a cross-sectional first dimension that extends between and contacts an indented, transition region of a weatherstrip body and an inner surface of a cap/bright strip.

The plug reduces potential damage to an associated cap of an associated weatherstrip assembly that includes an associated body having a vehicle mounting portion, at least one seal member extending from a first surface of the body, and a second surface of the body including laterally spaced, outwardly facing first and second shoulders and an indented region disposed between the shoulders. The associated cap has first and second edges mounted to the first and second shoulders, respectively, of the body. When the cap is mounted to the body, a central portion of the cap is spaced from the indented, transition region of the body and forms a cavity therebetween extending along a longitudinal dimension of the body that receives the plug therein.

The elongated member has a cylindrical outer surface in one version, and more particularly may include a central opening to form a hollow cylindrical conformation.

In another embodiment, the elongated member is integrally formed with the associated body of the weatherstrip. The elongated member may include a first end integrally joined to the associated body and a bifurcated second end that abuts an inner surface of the cap.

The elongated member may include a rounded protrusion that has a contour dimensioned for mating receipt with the indented, transition region of the body.

The elongated member may include rounded contour surfaces located on either side of the rounded protrusion dimensioned for selective abutment with a gripping region of the second leg and an angled region of the second leg, respectively.

Additional rounded protrusions may be provide and are dimensioned for selective abutment with an inner surface of the cap.

In another embodiment, first and second extending members protrude laterally from opposite regions of the elongated member and dimensioned for receipt in notched contours of the first and second shoulders, respectively.

In still another embodiment, the elongated member includes a recess that matingly receives a central coextruded extension extending from the transition region of the second leg.

A process of forming an elongated member that reduces potential damage to an associated cap of an associated weatherstrip assembly includes dimensioning the elongated member to have a cross-sectional first dimension that extends between and contacts an indented, transition region of the body and an inner surface of the cap.

The forming step may include the extruding the elongated member.

The process may also include providing locating portions on the second leg for receiving a protrusion on the elongated member.

The process of forming another embodiment includes forming lateral extensions on the elongated member that are dimensioned for receipt beneath the first and second shoulders.

The process includes inserting the first lateral extension beneath the first shoulder and subsequently snap fitting the second lateral extension beneath the second shoulder to locate the elongated member in the cavity.

Benefits and advantages of the present disclosure will become more apparent from reading and understanding the following detailed description.

DETAILED DESCRIPTION

The following description with reference to the accompanying drawings is provided to assist in a comprehensive understanding of one or more embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the spirit and scope of the present disclosure. Various exemplary embodiments of the present disclosure are not limited to the specific details of different embodiments and should be construed as including all changes and/or equivalents or substitutes included in the ideas and technological scope of the appended claims. In describing the drawings, similar reference numerals are used where possible to refer to similar elements.

The terms "include" or "may include" used in the present disclosure indicate the presence of disclosed corresponding functions, operations, elements, and the like, and do not limit additional one or more functions, operations, elements, and the like. In addition, it should be understood that the terms "include", "including", "have" or "having" used in the present disclosure are to indicate the presence of components, features, numbers, steps, operations, elements, parts, or a combination thereof described in the specification, and do not preclude the presence or addition of one or more other features, numbers, steps, operations, elements, parts, or a combination thereof.

The terms "or" or "at least one of A or/and B" used in the present disclosure include any and all combinations of words enumerated with them. For example, "A or B" or "at least one of A or/and B" mean including A, including B, or including both A and B.

Although the terms such as "first" and "second" used in the present disclosure may modify various elements of the different exemplary embodiments, these terms do not limit the corresponding elements. For example, these terms do not limit an order and/or importance of the corresponding elements, nor do these terms preclude additional elements (e.g., second, third, etc.) The terms may be used to distinguish one element from another element. For example, a first mechanical device and a second mechanical device all indicate mechanical devices and may indicate different types of mechanical devices or the same type of mechanical device. For example, a first element may be named a second element without departing from the scope of the various exemplary embodiments of the present disclosure, and similarly, a second element may be named a first element.

It will be understood that, when an element is mentioned as being "connected" or "coupled" to another element, the element may be directly connected or coupled to another element, or there may be an intervening element between the element and another element. To the contrary, it will be understood that, when an element is mentioned as being "directly connected" or "directly coupled" to another element, there is no intervening element between the element and another element.

The terms used in the various exemplary embodiments of the present disclosure are for the purpose of describing specific exemplary embodiments only and are not intended to limit various exemplary embodiments of the present disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having inconsistent or exaggerated meanings unless they are clearly defined in the various exemplary embodiments.

Figure 1:
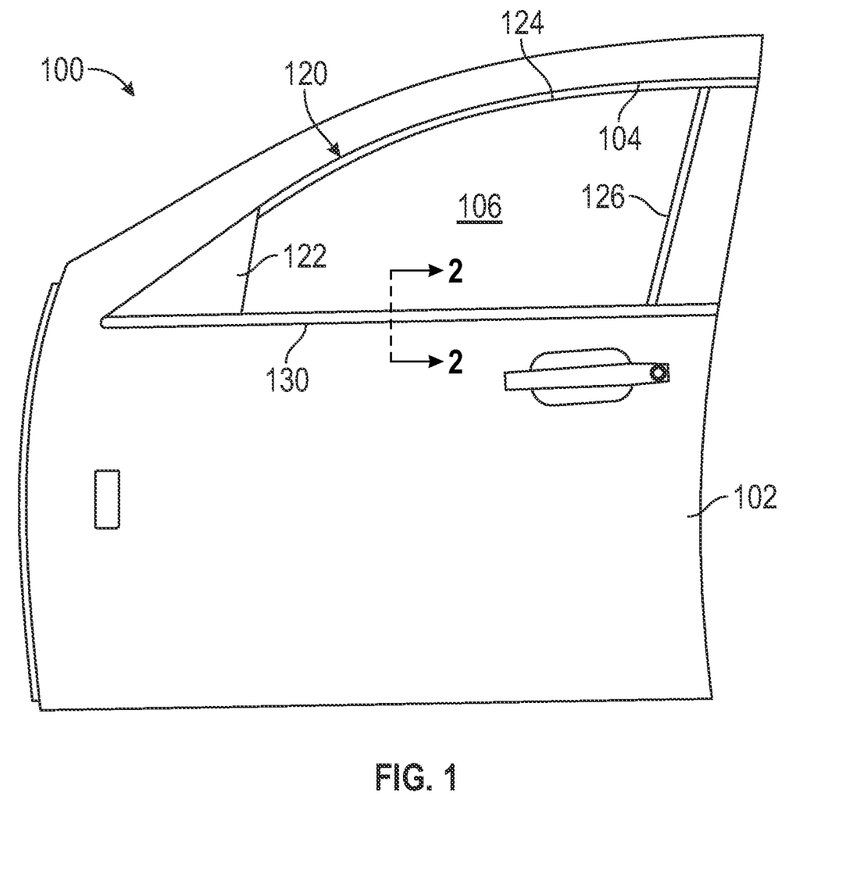
FIG. 1 is an elevational view of a door of the vehicle.

Turning to FIG. 1, there is shown a portion of a vehicle 100, particularly a door 102. An opening 104 is provided in the door 102 and the opening is selectively closed or open by raising and lowering a window 106. Particular details of the structure and operation of the window 106 and the mounting of the window in the vehicle door 102 are well known in the art so that further description herein is unnecessary to a full and complete understanding of the present disclosure.

A weatherstrip assembly or weatherstrip 120 is provided and interfaces between the vehicle door opening 104 and perimeter portions of the window 106. In addition to providing an aesthetic transition between the vehicle door 102 and the window 106, the weatherstrip 120 provides a seal between the vehicle interior and the external environment. The weatherstrip 120 may be manufactured and/or assembled as one or more components and generally provides a perimeter sealing function adjacent an A-pillar represented here by mirror sail portion 122, a header portion 124, and a B-pillar portion 126. These three weatherstrip portions 122, 124, 126 may be formed as generally U-shaped components having inner and outer legs interconnected by a base or bight portion that together form a recess that receives respective outer perimeter portions of the window 106 in these regions of the weatherstrip 120 in a window closed position.

Figure 2:
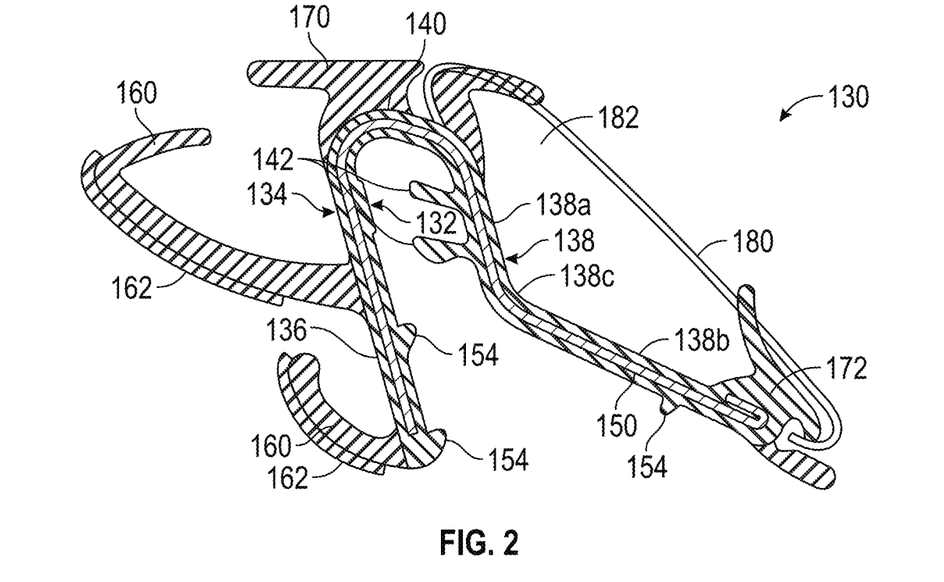
FIG. 2 is a cross-sectional view taken generally along the lines 2-2 of FIG. 1 without the inclusion of the inventive support plug.

Along a lower portion of the window opening 104, the weatherstrip 120 typically includes an inner belt/inner belt portion (not shown) and an outer belt/outer belt portion 130. Thus, as illustrated in FIG. 1, the outer belt 130 extends longitudinally (from front toward the rear of the vehicle) along a lower edge of the door opening 104 between the A pillar/mirror sail and the B pillar. More particular details of the outer belt 130 are shown in FIG. 2. Preferably, the conformation of the outer belt 130 is conducive to being extruded, i.e., the outer belt has a cross-sectional profile that allows continuous, elongated weatherstrip profiles to be formed and subsequently cut to length (i.e., the length shown in FIG. 1) and advantageously provides the desired attachment, sealing, and aesthetic transition functions of the outer belt portion of the weatherstrip 120.

The outer belt 130 of the weatherstrip assembly 120 includes a body 132 formed from an extruded material, e.g., any one or more of conventional elastomer, rubber, or plastic materials used in the industry. The outer belt body 132 is configured to form a mounting portion 134 which in this particular illustrated version includes an inverted U-shaped cross-sectional structure having a first or inner leg 136, a second or outer leg 138, and an interconnecting base 140. Although the particular conformation of these components may vary, it is common for the first leg 136 to have a substantially linear configuration while the second leg 138 includes a linear gripping region 138a and an angled region 138b that extends along an outer surface of the door 102. To facilitate the mounting or attaching of the outer belt 130 to the door 102, inner surfaces of the first leg 136 and the linear gripping region 138a of the second leg 138 may include gripping flanges 142 that frictionally engage a door flange (not shown), again in a manner that is conventionally known in the art so that further discussion herein is unnecessary. To improve the strength and rigidity of the outer belt in the mounting portion 134, the body may include a carrier or support 150 such as a metal or rigid plastic that is encapsulated or at least partially encapsulated by the body material during the extrusion process. It is common for the carrier 150 to be deformed or bent to the desired inverted U-shape and the body material extruded thereover to at least partially or completely encapsulate the carrier. On the other hand, the gripping flanges 142 may be formed from the same material as the remainder of the extruded body or may be a different material that enhances the gripping function. Further, deformable seal protrusions 154 may also be provided at spaced locations along the first and second legs 136, 138 for engagement with the door 102.

At least one seal member, shown here as a pair of the seal lips 160, extends outwardly from a first surface of the body 132. As shown in FIG. 2, the first and second seal lips 160 are preferably coextruded with the remainder of the body and extend outwardly from a first surface of the first leg 136 for engagement with the window 106 (not shown in FIG. 2). The seal lips 160 may include a low friction material 162 that slidingly, sealingly engage with the exterior surface of the window 106. A second surface of the body 132 includes outwardly facing first and second shoulders 170, 172 that are laterally spaced apart on opposite sides of an indented region formed by the transition 138c between the linear mounting region 138a and the angled region 138b of the second leg 138. The first and second shoulders 170, 172 are contoured to receive or mount laterally spaced longitudinal edges of a cap or bright strip 180. When the cap/bright strip 180 is secured to the body (i.e., the shoulders 170, 172), a central portion of the cap is mounted in spaced relation from the transition region 138c of the second leg 138 of the body 132 and thus forms a cavity 182 therebetween extending along a longitudinal dimension of the body. As is evident in FIG. 2, in this arrangement, the cap 180 has a relatively wide and relatively elongated unbraced span that is believed to contribute to the potential for the cap/bright strip to be dented or marred during assembly or after mounting to the vehicle. Unfortunately, this can lead to undesired repair costs.

Figure 3:
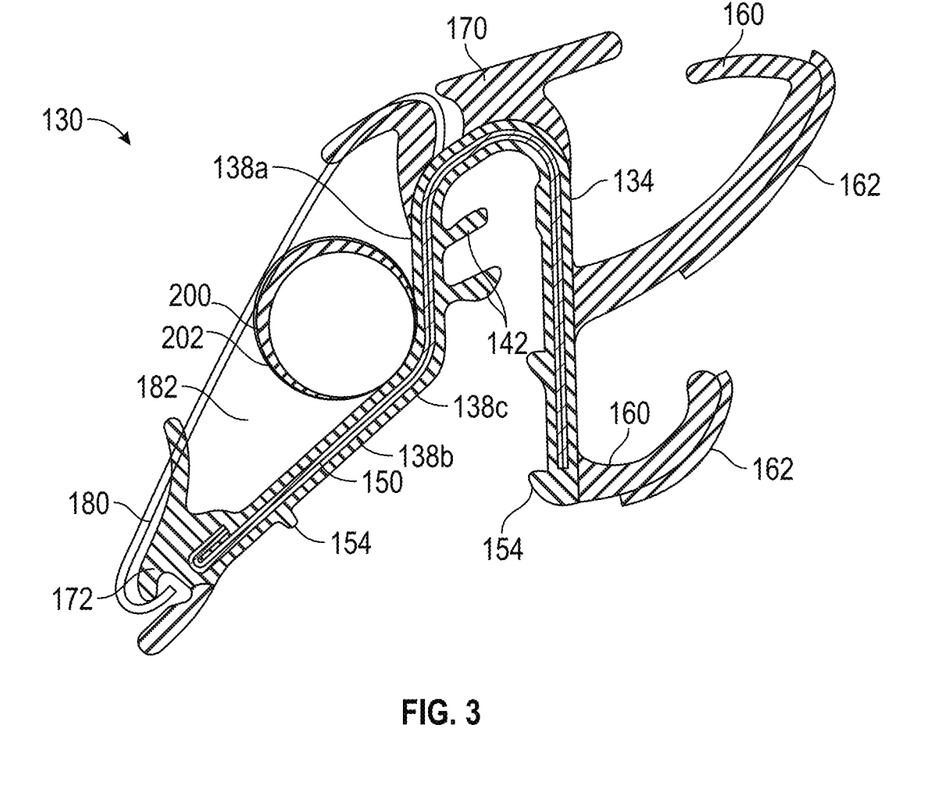
FIG. 3 is a cross-sectional view (rotated 180°) that is substantially similar to FIG. 2 and incorporates one version of the inventive support plug.

Various possible solutions are proposed to address potential damage to the outer belt/bright strip 180. With reference to FIG. 3, like reference numerals are used to describe like components previously described in connection with FIG. 2, while new numerals are used to describe new components associated with the preferred solutions for potential damage to the cap/bright strip 180. As shown in FIG. 3, an elongated hollow cylindrical support or plug 200 is provided and disposed within the cavity 182. Preferably, the plug 200 has a relatively thin wall 202 while still maintaining sufficient rigidity to support an inner surface of a central region of the bright strip 180, preferably at a location generally opposite that of the transition 138c. The hollow, round plug 200 provides the desired support and reduces the unbraced length of the bright strip 180 by providing a member that engages the cap/bright strip and the transition region of the weatherstrip. Unfortunately, the cylindrical plug 200 may be deemed relatively inconsistent in application due to the non-symmetrical shape of the interior cavity 182 beneath the cap 180.

Figure 4:
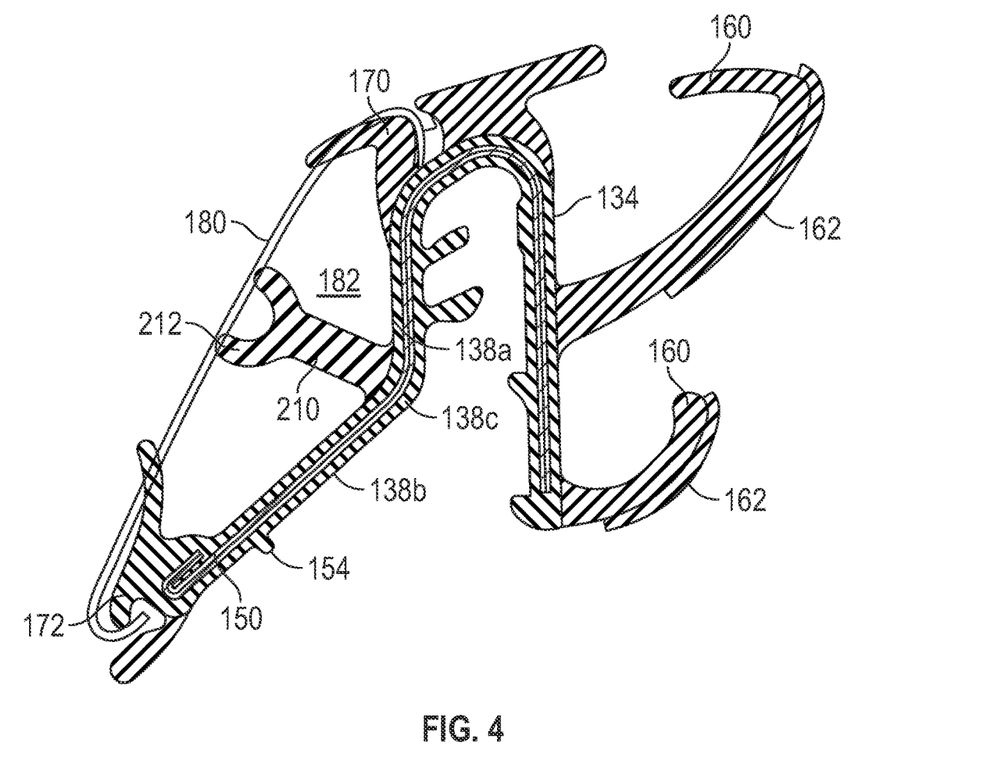
FIG. 4 is a cross-sectional view of a second preferred arrangement of the support plug.

In FIG. 4, support 210 is integrally formed with the remainder of the body and extends outwardly from the second leg 138. The support 210 preferably includes a bifurcated end 212 that engages the inner surface of the cap/bright strip 180 at spaced apart first and second locations. The support 210 has the advantage of ease of manufacture and that the support can be coextruded like other portions of the body 132, e.g., shoulders 170, 172, seal lips 160, retaining flanges 142, etc. Of course, one skilled in the art will recognize that the support plug 210 may also be formed as a separate component and subsequently inserted into the cavity 182 as an alternative to the integrated coextruded version shown in FIG. 4 without departing from the scope and intent of the present disclosure.

Figure 5:
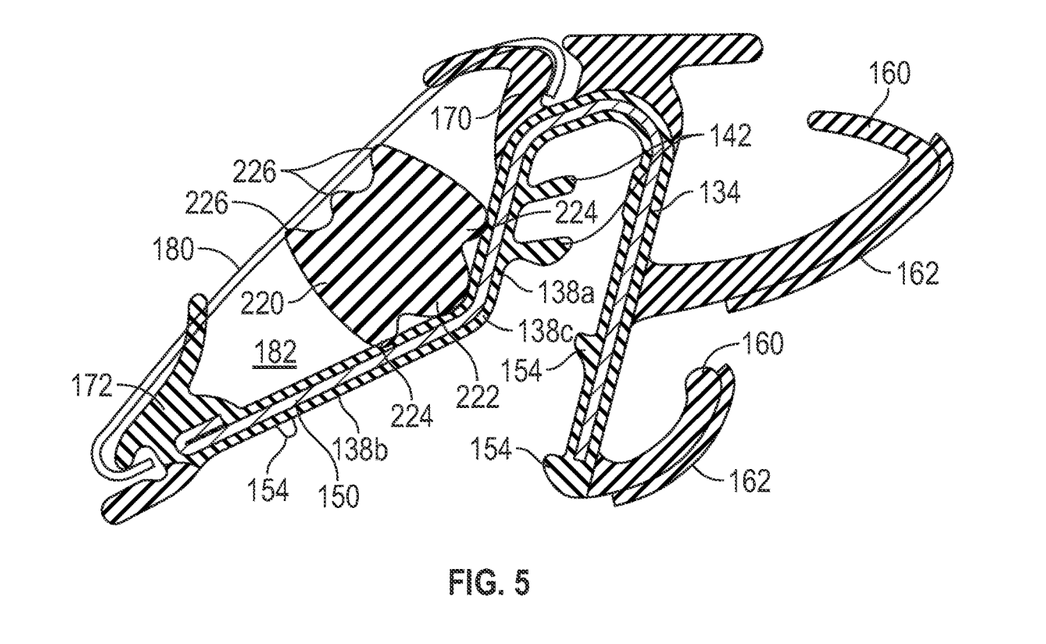
FIG. 5 is a cross-sectional view of a third preferred arrangement of the support plug.

FIGS. 5-11 bear similarity with one another with respect to different embodiments of a support or plug 220. As shown in FIG. 5, the plug 220 has a generally solid cross-section and specifically unique external design contours assist in positioning or locating the plug within the cavity 182. An enlarged protrusion 222 has a smooth rounded convex contour, for example, that generally mates with that of the transition 138c of the second leg 138 of the outer belt weatherstrip 130. Additional, smaller rounded contour surfaces 224 are adapted to engage the linear portion 138a and the angled portion 138b of the second leg, respectively. The opposite face of the plug 220 preferably includes multiple protrusions or rounded surfaces 226 that are spaced from one another and engage distinct spaced inner surface areas of the bright strip generally opposite that of the transition 138c. This configuration of the plug 220 can be extruded as a separate component and inserted longitudinally into the cavity 182.

Figure 6:
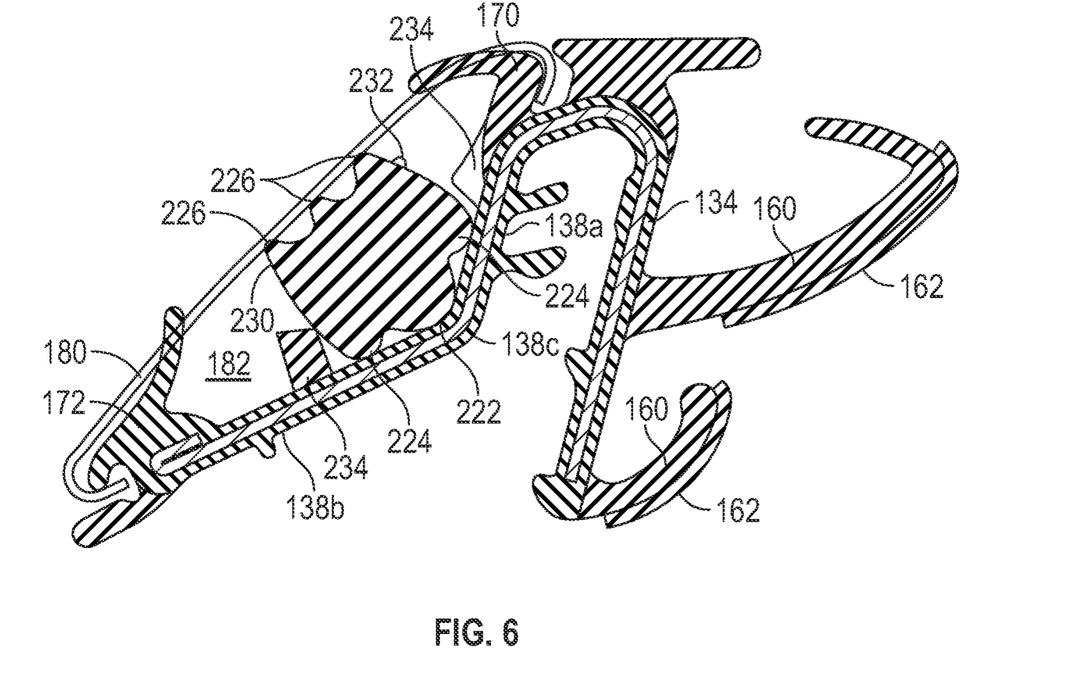
FIG. 6 is a cross-sectional view of a modified, fourth version of the third preferred arrangement of the support plug.

As shown in FIG. 6, orientation of the separately formed plug 230 can be determined by adding an orienting feature such as tab 232. Further, additional coextruded extensions 234 may protrude outwardly from the body to further locate and orient the plug 230 in the cavity 172. Thus, plug 230 includes the enlarged protrusion 222 that mates with the transition region 138c of the second leg 138 of the outer belt 130, as well as the rounded contour surfaces 224 designed to engage adjacent portions of the second leg and the rounded protrusions 226 that engage the inner surface of the cap/bright strip 180 opposite the second leg.

Figure 7:
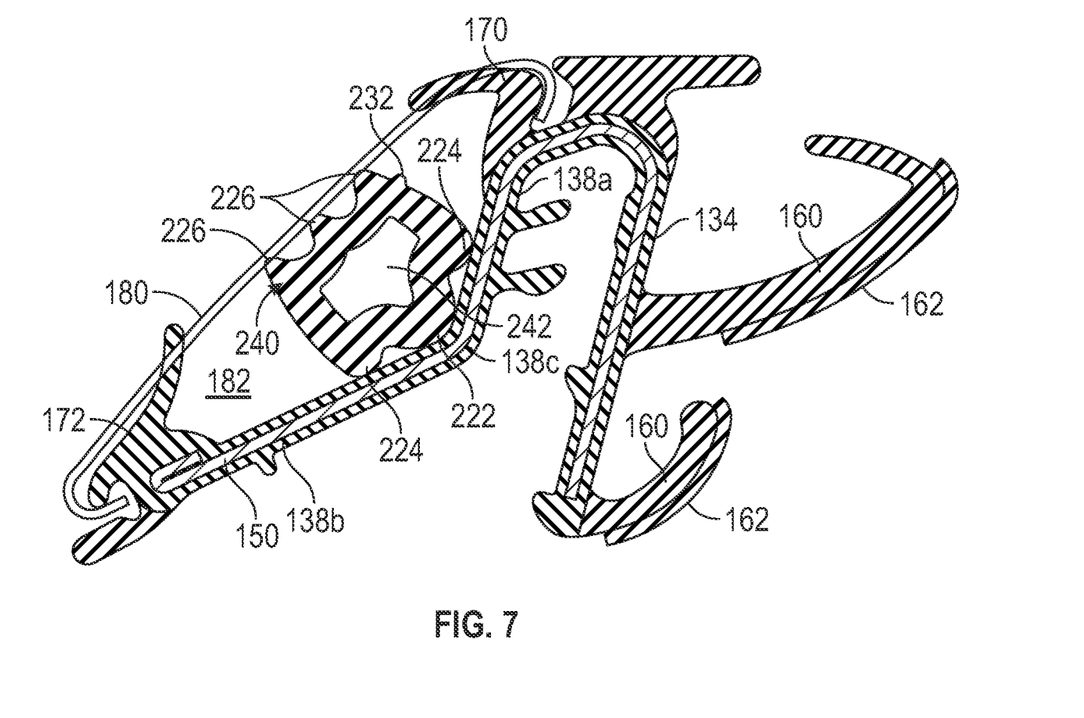
FIG. 7 is a cross-sectional view of a fifth version of the support plug.

In FIG. 7, the plug 240 has some similarities to the plugs shown and described in FIGS. 5-6. The plug 240 includes the orienting tab 232, as well as the rounded protrusions 222, 224, 226. The primary distinction of plug 240 relative to the plugs 220, 230 of FIGS. 5 and 6, relates to the central hollow region 242 to reduce the amount of material and overall weight of this modified plug. As is evident, however, the hollow region 242 substantially follows the external contours of the plug 240 so that the plug has a generally constant wall thickness for desired strength and rigidity.

Figure 8:
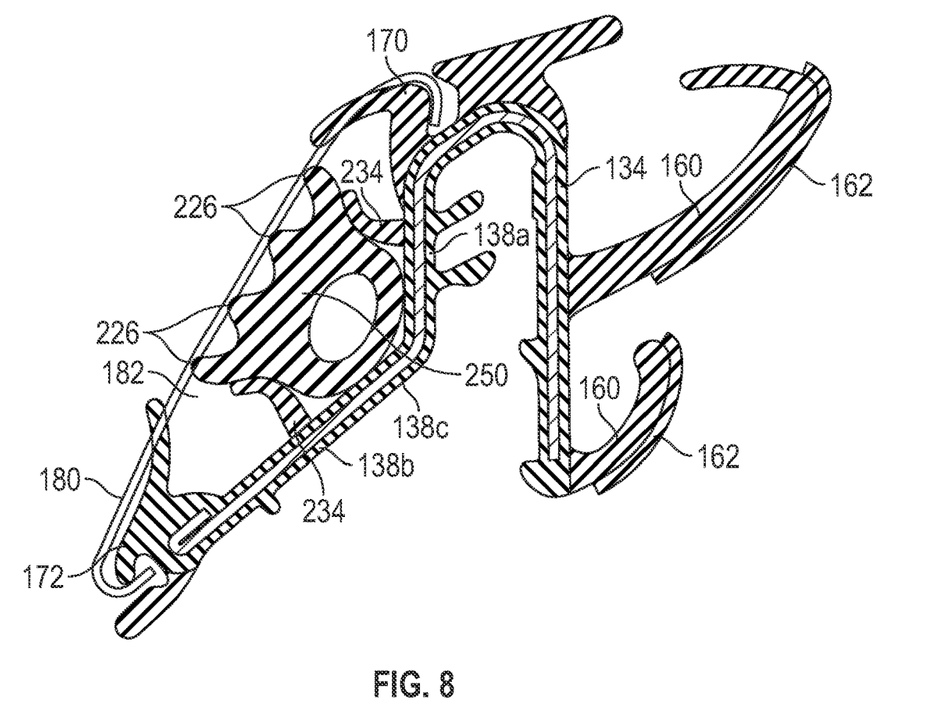
FIG. 8 is a cross-sectional view of a sixth version of the support plug.

FIG. 8 illustrates a plug 250 that adopts select features found in the embodiments of FIG. 3, FIG. 6, and FIG. 7 described above. Specifically, that face of the plug 250 that faces the transition region 138c of the second leg 138 has a substantially hollow cylindrical portion that is similar to the hollow cylindrical plug 200 found in FIG. 3. In addition, multiple rounded protrusions 226 are provided on that portion of the plug that engages with the inner surface of the cap/bright strip 180 opposite the transition region 138c in a manner similar to the plug embodiments of FIGS. 6-7. Still further, additional coextruded extensions 234 may protrude outwardly from the body to further locate and orient the plug 250 in the cavity 172.

Figure 9:
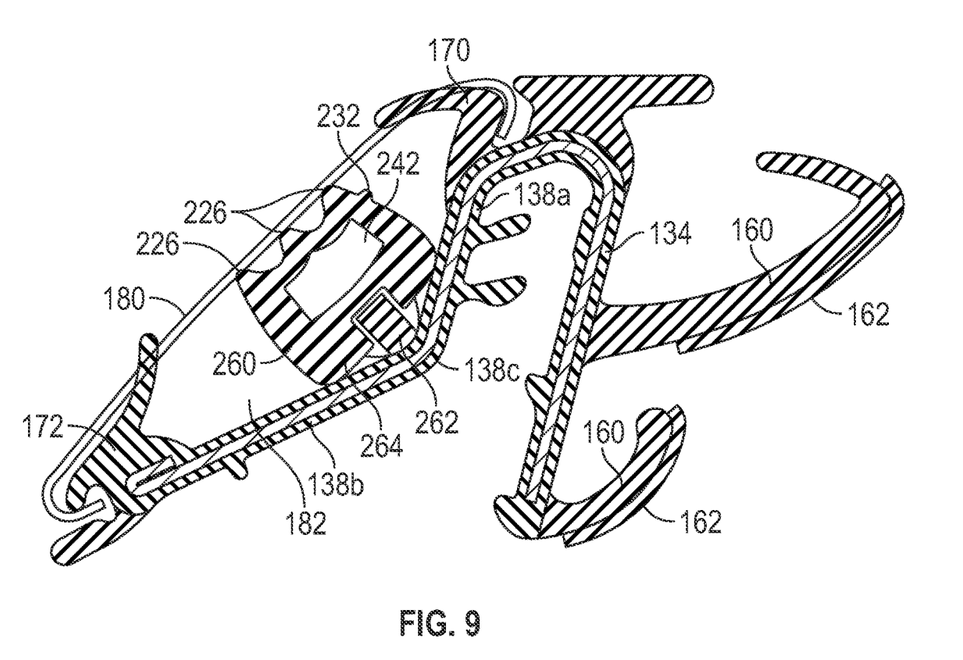
FIG. 9 is a cross-sectional view of a seventh embodiment of the support plug.

The plug 260 of FIG. 9 adopts similar features from the embodiment of plug 240 of FIG. 7; however, it includes a central coextruded extension 262 extending from the transition region 138c of the second leg 138 that is received in a mating recess 264 in the plug 260. The interconnection of the extension 262 and the recess 264 provides for accurate, repeatable location of the support plug 260 in the cavity 182.

Figure 10:
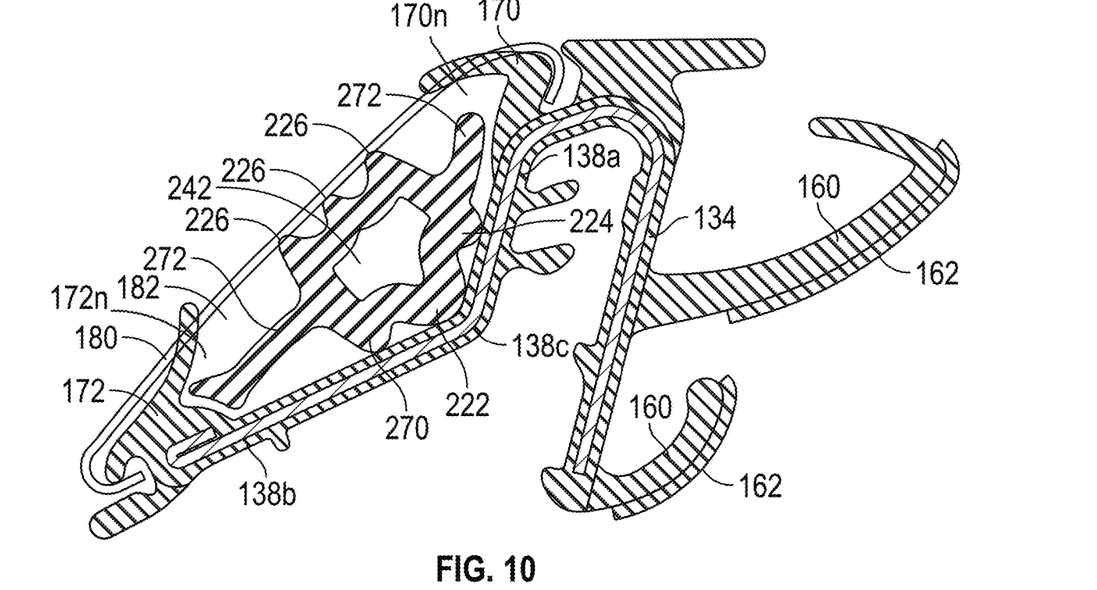
FIG. 10 is a cross-sectional view of an eighth embodiment of the support plug.
Figure 11:
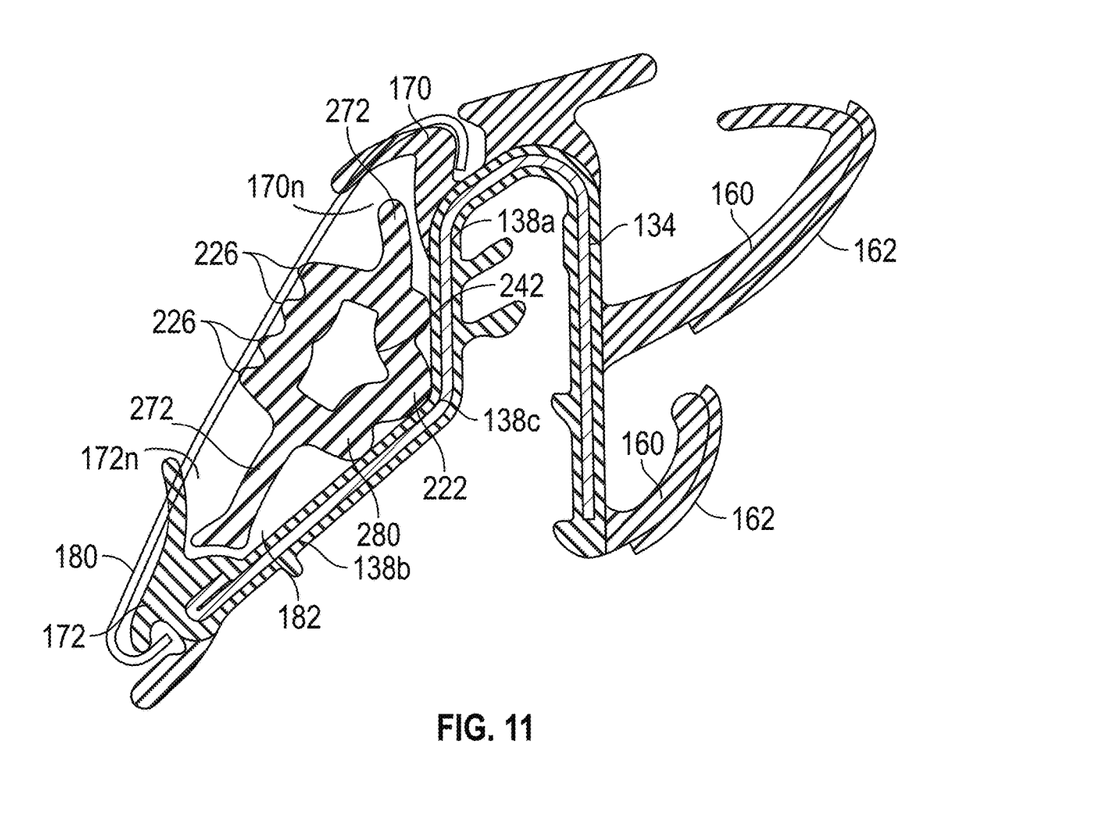
FIG. 11 is a cross-sectional view of a ninth embodiment of the support plug.

Lastly, and with reference to FIGS. 10 and 11, there are shown slightly different variants of a plug 270 (FIG. 10) and plug 280 (FIG. 11). Outwardly extending lateral members or wings 272 protrude laterally from opposite regions of the plug 270 or 280 for receipt in the respective first and second notched contour regions 170n, 172n of the shoulders 170, 172 extending from the second leg 138 of the outer belt body 132. One of the extending wings 272 can be received within its associated notched contour region 170n of a first one of the shoulders 170, and then the other of the extending wings 272 can be snap fit within the notched contour region 172n of a second one of the shoulders 172. Thus, in a preferred process of assembly one of the wings 272 is inserted into the cavity 182 and into the notched contour region 170n beneath one of the shoulders 170. Thereafter, the plug 270 or plug 280 is rotated so that the other wing 272 is snap fit into the notched contour region 172n beneath the other shoulder 172. This provides for desired accuracy in mounting, provides tactile feedback during assembly that the plug has been mounted, locates the plug within the cavity of the weatherstrip, and assures repeatability during assembly, as well as repeatability and performance once assembled. It will be appreciated that variations of the structures shown in FIGS. 10 and 11 could also be used. For example, it is contemplated that alternative plugs may eliminate the hollow central opening, or some, the same, or more rounded contour surfaces 226 provided to engage the linear portion 138a and the angled portion 138b of the second leg, respectively, or the opposite face of the plug 220 may or may not include multiple protrusions or rounded surfaces 226, or a different number or conformation of the protrusions may be used, etc.—without departing from the scope and intent of the present disclosure. Preferably, the profiles on the elongated member that defines the plug would advantageously have a cross-sectional profile that achieves the desired support function, and is also amenable to being extruded for ease of manufacture. Preferred exemplary materials for forming any one of the above-described embodiments of the plug include elastomers, plastics, or combinations of the materials. The preferred material of the plug provides the desired support of the cap/bright strip, can be easily extruded either as a separate plug, or co-extruded with other portions of the weatherstrip assembly. Of course this list of materials is not exhaustive and still other materials can be used to form the plug where that material is, for example, economical to use, easy to extrude, and able to maintain the desired support of the cap/bright strip.

Although these preferred apparatus and preferred processes outline a desired configuration or order of individual steps, one skilled in the art will appreciate that still other combinations of the apparatus features or process steps may be included, some omitted, or possibly another order of one or more steps could be provided.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept or that do not differ from the literal language of the claims, or if they include equivalent structural elements with insubstantial differences from the same concept or from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

Although specific advantages have been enumerated above, various embodiments may include some, none, or all of the enumerated advantages. Although exemplary embodiments are illustrated in the figures and description herein, the principles of the present disclosure may be implemented using any number of techniques, whether currently known or not. Moreover, the operations of the systems and apparatuses disclosed herein may be performed by more, fewer, or other components, and the methods described herein may include more, fewer, or other steps. Additionally, steps may be performed in any suitable order.

To aid the Patent Office and any readers of this application and any resulting patent in interpreting the claims appended hereto, applicants do not intend any of the appended claims or claim elements to invoke 35 USC 112 (f) unless the words "means for" or "step for" are explicitly used in the particular claim.

COMPONENT LIST 100 vehicle
102 door
104 door opening
106 window
120 weatherstrip assembly/weatherstrip
122 A-pillar/mirror sail portion
124 header portion
126 B-pillar portion
130 outer belt portion/outer belt
132 body 134 mounting portion
136 first/inner leg
138 2$^{nd}$/outer leg
138a linear gripping region
138b angled region
138c transition region
140 interconnecting base
142 gripping flanges
150 carrier/support
154 seal protrusions
160 seal lips
162 low friction material
170 first shoulder
172 second shoulder
180 cap/bright strip
182 cavity
200 support/plug
202 thin wall
210 support/plug (FIG. 4)
212 bifurcated end
220 support/plug (FIG. 5)
222 enlarged protrusion
224 rounded contour surfaces
226 protrusions/rounded surfaces
230 support/plug (FIG. 6)
232 orienting feature/tab
234 coextruded extensions
240 support/plug (FIG. 7)
242 central hollow region
250 support/plug (FIG. 8)
260 support/plug (FIG. 9)
270 support/plug (FIG. 10)
272 extending lateral members/wings
280 support/plug (FIG. 11)

I claim:

1. A plug for reducing potential damage to a cap of a weatherstrip assembly, the weatherstrip assembly including a body having a vehicle mounting portion, at least one seal member extending from a first surface of the body, and a second surface of the body including laterally spaced, outwardly facing first and second shoulders and an indented region disposed between the shoulders, the cap having first and second edges mounted on the first and second shoulders, respectively, of the body and a central portion of the cap is spaced from the indented region of the body and forming a cavity therebetween extending along a longitudinal dimension of the body, the plug comprising:
an elongated member being a separate element from the cap and having a cross-sectional dimension that extends between and contacts the indented region of the body and an inner surface of the cap; and
first and second laterally extending members protruding laterally from opposite regions of the elongated member and received in first and second notched contour regions of the first and second shoulders, respectively.

2. The plug of claim 1 wherein the elongated member includes a central opening forming a hollow cavity.

3. The plug of claim 1 wherein the elongated member includes a rounded protrusion received in the indented region of the body.

4. The plug of claim 3 further comprising additional rounded protrusions abutting the inner surface of the cap.

5. A process of limiting potential damage to a cap of a weatherstrip assembly, the weatherstrip assembly including a body having a vehicle mounting portion, at least one seal member extending from a first surface of the body, and a second surface of the body including laterally spaced, outwardly facing first and second shoulders and an indented region disposed between the shoulders, the cap having first and second edges mounted on the first and second shoulders, respectively, of the body and a central portion of the cap is spaced from the indented region of the body and forming a cavity therebetween extending along a longitudinal dimension of the body, the process comprising:
forming an elongated member to be a separate element from the cap;
forming first and second lateral extensions protruding laterally from opposite regions of the elongated member that are dimensioned for receipt respectively in first and second notched contour regions of the first and second shoulders;
dimensioning the elongated member to have a cross-sectional dimension that extends between and contacts the indented region of the body and an inner surface of the cap; and
inserting the first lateral extension into the first notched contour region of the first shoulder and subsequently fitting the second lateral extension into the second notched contour region of the second shoulder to locate the elongated member in the cavity and between the first shoulder and the second shoulder.

6. The process of claim 5 wherein the step of forming the elongated member includes extruding the elongated member.

7. The process of claim 5 wherein said step of subsequently fitting the second lateral extension into said second notched contour region comprises snap fitting the second lateral extension into said second notched contour region.

8. The process of claim 7 further comprising providing a central opening through the elongated member.

* * * * *